United States Patent Office 3,496,129
Patented Feb. 17, 1970

3,496,129
LOW VISCOSITY, UNSATURATED HYDROCARBON POLYMERS AND COATING COMPOSITIONS CONTAINING THESE POLYMERS
Marco Wismer, Gibsonia, and Paul J. Prucnal, Cheswick, Pa., assignors, by mesne assignments, to PPG Industries, Inc., Pittsburgh, Pa., a corporation of Pennsylvania
No Drawing. Filed Nov. 23, 1964, Ser. No. 413,326
Int. Cl. C08f 17/00, 39/00
U.S. Cl. 260—23.7     31 Claims

ABSTRACT OF THE DISCLOSURE

The invention relates to non-rubbery interpolymers of a polyunsaturated hydrocarbon monomer and at least one monoolefin monomer having a single copolymerizable ethylenic group, said interpolymer having an essentially saturated carbon chain containing a substantial proportion of the total carbon atoms in the polymer molecule and containing sufficient ethylenically unsaturated groups in the polymer molecule to permit substantial curing of films thereof by oxidative mechanism and the use of said interpolymers, either alone or in combination with other reactive materials as coating compositions.

---

This invention relates to interpolymers of ethylenic hydrocarbons and to coating compositions made therefrom, and more particularly, to such interpolymers and coating compositions which cure through an oxidative mechanism.

Interpolymers of ethylene, propylene and similar ethylenic hydrocarbons containing small amounts of interpolymerized polyunsaturated compounds are of increasing interest. Such interpolymers are disclosed, for example, in U.S. Patent Nos. 2,933,480; 3,000,866 and 3,093,621; and in British Patent No. 880,904. These interpolymers as known heretofore are elastomers characterized by their rubbery properties, and in common with conventional rubbers, are cured by vulcanization, generally utilizing sulfur as the vulcanizing agent.

Although at times such interpolymers have been considered for use as coatings in certain specialized applications, as in extruded wire coverings or impregnated textiles, these rubbery interpolymers are not usable in protective and decorative surface coating compositions to be applied by spraying, brushing, or similar techniques. This is due both to their lack of satisfactory application properties and because coating made thereform are relatively soft, have poor adhesion, require vulcanization, and are otherwise unsuitable for most coating uses.

It has now been discovered that by proper choice of reactants and interpolymerization conditions, there are obtained interpolymers of ethylenic hydrocarbons and polyunsaturated compounds that can be employed in coating compositions applied by conventional means to provide cured coatings of highly desirable properties.

The interpolymers of this invention contain a substantial proportion of a polyunsaturated hydrocarbon, preferably having nonconjugated ethylenic groups, and interpolymerized therewith at least one monoolefin having a single copolymerizable ethylenic group. The interpolymers are obtained by polymerization in the presence of a transition metal catalyst, and they are further characterized by containing sufficient remaining ethylenic unsaturation in the polymer molecule to permit substantial curing of films thereof by oxidative mechanism.

Substantial curing by oxidative mechanism means that a thin film of the material upon exposure to air cures sufficiently to become tack-free and essentially insoluble in aliphatic hydrocarbons, such as heptane. Films of the interpolymers contemplated herein cure by autooxidation, whereby they absorb oxygen from the air and build up a cross-linked structure, probably through the formation of intermediate hydroperoxides and other oxygenated compounds. While curing may continue for days, or even weeks, sufficient curing to achieve a tack-free state takes place within a reasonable time, 24 hours being usually taken as indicative.

The temperature of curing can vary; the preferred interpolymers substantially cure at ambient temperatures, and in any event below 100° F., but desirable materials can be produced which require somewhat higher curing temperatures, although in all cases the cure mechanism is oxidative. It is to be understood that in defining the interpolymers herein, the curing properties set forth do not limit the possible methods of curing that can be used; for example, driers, such as metal naphthenates, can be employed to accelerate the cure, or a high oxygen atmosphere and higher temperatures than the minimum necessary can be used for the same purpose. Cross-linking agents can also be added, or cure can be induced by ultra-violet or other radiation, with or without the presence of photosensitizers, such as benzophenones.

The interpolymers of the present invention differ from the rubbery polymers known heretofore in several important respects, including the following:

(1) The interpolymers herein contain a comparatively high degree of functional unsaturation. This permits their curing by an oxidative mechanism to a highly cross-linked structure, whereas the rubbery polymers cannot be cured to this extent and require the use of a vulcanizing agent to achieve any degree of cure at all. The preferred interpolymers produced in accordance with this invention contain at least about 2 weight percent unsaturation, as defined below, and may have up to about 25 percent or even more. The rubbery polymers used as elastomers contain at most about 2 weight percent unsaturation, and generally less. It is extremely difficult to accurately determine unsaturation of these polymers by the iodine value procedure; however, the iodine values calculated from the level of unsaturation of the interpolymers herein are higher than those of the common rubbery polymers.

(2) As indicated, the mechanism of curing of these interpolymers differs from that of the rubbery polymers, and the extent of cross-linking thereby achieved is much higher. Whereas the rubbery polymers have a very low cross-link density, even if vulcanized, films of the present interpolymers are, contrastingly, air-drying, and when air-dried are sufficiently cured to achieve the properties necessary in a desirable coating, i.e., hardness, mar resistance, abrasion resistance, and the like. The mechanism of cure is oxidative, involving the reaction of oxygen with the unsaturated linkages; this is evidenced, for example, by continuous infra-red spectrographic examination of a film, which shows a progressive increase in oxidation products, such as carbonyl, during curing.

(3) The interpolymers of this invention are of lower molecular weight than the rubbery polymers, as indicated by their lower intrinsic viscosity. (Intrinsic viscosity is described, for example, in the book by Allen entitled "Techniques of Polymer Characterization," Butterworth Publicatons, Ltd., London, 1959; the values herein being measured in benzene at 25° C., using an Ubbelohde dilution viscometer.) The intrinsic viscosity of the known rubbery polymers is at least 1.0, and usually 1.5 or higher, corresponding to a molecular weight of 50,000 or more. This is generally considerably higher than the intrinsic viscosity of the present interpolymers, which preferably have an intrinsic viscosity no higher than about 0.6, and usually quite lower; interpolymers of somewhat higher intrinsic viscosity can be employed for coatings in accordance with this invention, so long as the degree of unsaturation mentioned above is present.

(4) The present interpolymers are much more soluble in organic solvents than are the aforesaid rubbery polymers and can be dissolved in appreciable concentrations while maintaining a usable solution viscosity. For example, the preferred interpolymers have a Gardner-Holdt viscosity of Z or lower at 20 percent solids concentration in Solvesso 100 (aromatic naphtha) or xylene. This permits their use as a film-forming component in organic solvent based coating compositions and, therefore, they can be used to provide stable coating compositions having desirable application properties. Solutions of rubbery polymers containing only about 10 to 15 percent solids have a completely unworkable viscosity, whereas there can be obtained solutions of the present interpolymers in benzene, xylene, aromatic naphtha or other solvents containing as much as 70 percet or more resin solids and having a utilizable viscosity.

In addition to their advantages over the related rubbery polymers, the interpolymers of the invention are highly advantageous as compared, for example, to the polymers of butadiene whch have been employed in coating compositions. For instance, polybutadiene and butadiene-styrene copolymers result in brittle films which are useful only in very thin coatings, or which must be highly plasticized or otherwise modified to achieve the desired properties; thicker films of these materials can be cured only with extreme difficulty. The present interpolymers, on the other hand, are inherently flexible even in relatively thick coatings, and articles coated with these interpolymers can be formed and fabricated without destroying the continuity of the film.

Such differences are attributable in large part to the differing basic structure of the present interpolymers. These interpolymers have an essentially saturated carbon chain as the polymer backbone containing a substantial proportion (i.e., 20 percent or more) of the total carbon atoms in the polymer molecule. This polymer backbone, while essentially or predominantly saturated, contains some ethylenic unsaturation, principally in terminal position. At least a major part of the unsaturated linkages remaining in the polymer molecules are in pendant groups attached to the main polymer chain and are derived from the ethylenic linkages in the polyunsaturated component of the interpolymer.

The extent of unsaturation is sufficient to permit curing by oxidative mechanism, which in general requires at least about 2 percent by weight of unsaturation in the polymer. "Percent by weight of unsaturation," as employed herein refers to the weight of groups of the structure $$-\overset{|}{C}=\overset{|}{C}-$$

compared to the total weight of interpolymer. For instance, 2 percent by weight of unsaturation means each 100 grams of interpolymer contain 2 grams of carbon present in groups of the structure $$-\overset{|}{C}=\overset{|}{C}-$$

The extent of unsaturation in a large part determines the curing characteristics of coatings made from the interpolymer and the preferred materials have at least about 2.5 percent by weight of unsaturation. For good curing characteristics at ordinary room temperatures, it is desirable that the polymer contain at least about 3.5 percent by weight unsaturation.

As indicated above, it is difficult to accurately determine the extent of unsaturation in these products by ordinary analytical techniques. For example, iodine value determinations have been found to be unreliable, and accurate analysis by chemical means in general requires very tedious and time-consuming procedures. One method which is applicable and which is usually convenient is by means of infra-red spectroscopic examination. Using such a method, the infra-red curve of the interpolymer is obtained in which the unsaturation is exhibited by a characteristic peak, for example, at about 3.3 microns in carbon tetrachloride solutions of interpolymers containing dicyclopentadiene (other solvents may shift this peak somewhat). The quantitative extent of unsaturation is determined by comparing the characteristic peak obtained from the interpolymer with that of a known material of similar structure and previously determined unsaturation level. Other techniques using infra-red examination can also be employed.

Another method for determining the extent of unsaturation is by means of nuclear magnetic resonance spectroscopy. This is particularly applicable to interpolymers containing unsaturation derived from polyunsaturated compounds with residual unsaturation resulting from $$-\overset{R}{\underset{|}{C}}=\overset{H}{\underset{|}{C}}-$$

linkages, where R is hydrogen or alkyl, as in the case of the preferred interpolymers produced from dicyclopentadiene and similar polyunsaturated hydrocarbons.

In this method, a sample of the interpolymer is examined by a recording nuclear magnetic reasonance (NMR) spectrometer. A spectrum is obtained with a series of absorption peaks, relative to the base line, which are attributable to the various proton species present and the area of which is in each instance proportional to the number of protons causing the absorption. Olefinic protons, that is, protons attached to carbon atoms connected by a olefinic double bond, provide a particular absorption peak, which is located by reference to the spectrum of a material which is structurally equivalent to the unsaturated unit in the interpolymer. The position of the various absorptions is taken relative to a reference material includes with the sample, usually tetramethylsilane. When the level of unsaturation is low, it is desirable to employ a time-averaging computer (e.g., an Enhancetron) in conjunction with the NMR spectrometer, greater accuracy at low absorption levels being thus obtained.

By utilizing a known amount of the interpolymer and including therewith a known amount of another material which serves as an internal standard and which has a known weight of protons which give absorption in a region other than the interpolymer, the weight percent of olefinic protons in the interpolymer can be determined. The measurement of the area of each absorption peak is conventionally performed automatically by the NMR spectrometer, and is expressed as an "integral height." The integral height is proportional to the area of the absorption peak and is measured in arbitrary units from the base line to the point at which no further signal is recorded, as indicated by a plateau recorded by the spectrometer.

As an example of the manner in which NMR determinations, as discussed herein, are obtained, the weight percent unsaturation in an interpolymer of ethylene, propylene and dicyclopentadiene is determined as follows:

A known amount of interpolymer is dissolved in carbon tetrachloride or other solvent in a concentration ranging from about 2 to about 5 weight percent solids. It is desirable to obtain a solution with the lowest possible viscosity while still maintaining sufficient concentration for the sample to be observed by the NMR techniques There is added to the sample a quantitative amount of an internal standard; in this case, diphenyl ether is generally employed, since the absorption of the aromatic protons therein is in a different region than the absorption of the interpolymer. There is also added about 1 percent tetramethylsilane, which is used to obtain a reference point on the NMR spectrum. The sample is placed in a glass sample tube (5 mm. O.D., 0.5 mm. wall), and the NMR spectrum is obtained on a Varian Model A–60 spectrometer operating at 60 megacycles. The spectrum is recorded over a 500 cycles per second sweep width, downfield from the tetramethylsilane reference. The radio frequency level of the spectrometer is kept below the point of saturation. Additional spectral parameters vary from sample to sample, depending upon concentration and quality of the spectrum.

The spectrum shows NMR absorption in the regions $\tau=4.4$ to $\tau=4.5$ and $\tau=6.7$ to $\tau=9.5$. (The position of these absorptions is taken relative to the tetramethylsilane reference which occurs at $\tau=10$.) The position of the peaks is solvent dependent, and would usually be altered if the sample were dissolved in some solvent other than carbon tetrachloride. The series of absorptions in the region of $\tau=6.7$ to 9.5 is attributed to the aliphatic protons, including all methyls, methylenes, and methine species. The absorption in the region $\tau=4.4$ to 4.5 is specifically attributed to olefinic protons of the cyclopentene portion of the polymer. More specifically, the intense singlet in the region $\tau=8.7$ to $\tau=8.8$ is assigned to the methylene protons in the polymer unit, and the absoprtions to higher field in the region of $\tau=9.1$ to 9.2 is identified as methyl protons. The various smaller absorptions between $\tau=7.0$ and $\tau=8.3$ are attributed to the methine protons of the polymer unit as well as those protons resulting from the aliphatic portion of the cyclopentene. The absorptions due to the protons from the diphenyl ether are found at about $\tau=2.5$ to $\tau=3.3$.

The integral height of the absorption peaks of the olefinic protons and that of the diphenyl ether are obtained by the (automatic) measurement of the areas by the spectrometer, and the extent of unsaturation is then calulated by the following equation:

$$\text{Weight percent olefinic protons} = \frac{(.0588)(W_r)(I_x) \times 100}{(I_r)(W_x)}$$

where .0588 is the weight fraction of protons per mole of diphenyl ether (10 protons per 170 grams); $W_r$ and $W_x$ are the weights in grams of diphenyl ether and interpolymer respectively; and $I_r$ and $I_x$ are the integral heights in centimeters of the proton absorption peaks of the diphenyl ether and the interpolymer respectively. Since there are present two olefinic protons per

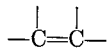

group, the weight percent of unsaturation is obtained by multiplying the figure obtained from the above calculation by 24/2 or 12.

It should be noted that the reactivity of the interpolymers herein is such that small but significant amounts of unsaturation may be lost by oxidation or other reaction during handling. This is especially true of small samples used for analysis. Therefore, it is desirable to protect the samples as much as possible, using, for example, an inert gas blanket, and to minimize handling and exposure. Otherwise, low values may be obtained on analysis. For this reason, it is usually better to rely on the curing characteristics as indicative of the necessary extent of unsaturation, with numerical values being used chiefly for comparison of samples handled similarly.

The proportions of the components of the interpolymer can be varied widely, it being necessary only to provide sufficient unsaturation in the polymer to permit oxidative curing. The amount varies with the particular polyunsaturated compound. For instance, there should be interpolymerized along with the monoolefin or monoolefins at least about 11 percent of dicyclopentadiene or similar diene.

Among the polyunsaturated compounds that can be employed in producing the interpolymers herein are the various dienes and other polyenes. It is preferred that the polyunsaturated hydrocarbon contain nonconjugated ethylenic groups, and it is preferred that it be alicyclic, this being particularly the case when the polyunsaturated compound contains conjugated unsaturation. Thus, nonconjugated polyenes and conjugated alicyclic polyenes are preferred to conjugated aliphatic polyenes.

Included among the polyunsaturated compounds that can be employed are cyclic polyenes such as cycloalkadienes; substituted norbornenes, e.g., 5-alkenyl-2-norbornenes; substituted norbornadienes, e.g., 2-alkyl norbornadienes; unsaturated terpenes, such as limonenes; and similar compounds. The polyene may contain substituents, such as halogen or oxygen-containing radicals, but in general, it is preferred to employ unsubstituted hydrocarbons containing only carbon and hydrogen.

Some representative examples of specific polyunsaturated compounds that can be utilized are:

1,4-pentadiene
1,9-decadiene
3,3-dimethyl-1,5-hexadiene
1,4-hexadiene
1,9-octadecadiene
6-methyl-1,5-heptadiene
7-methyl-1,6-octadiene
11-ethyl-1,11-tridecadiene
1,3-cyclopentadiene
1,3-cyclooctadiene
5-methyl-1,3-cyclopentadiene
1-methyl-3-isopropyl-1,3-cyclopentadiene
dicyclopentadiene
tricyclopentadiene
5-methyl-1,3-cyclopentadiene dimer
2-methyl-4-ethyl-1,3-cyclopentadiene dimer
1,4-cyclohexadiene
1,5-cyclooctadiene
1,5-cyclododecadiene
1,5,9-cyclododecatriene
1,4,6-cyclooctatriene
5-(2'-butenyl)-2-norbornene
5-(2'-ethyl-2'-butenyl)-2-norbornene
5-(1,5-propenyl)-2-norbornene
5-(2'-heptyl-1'-undecenyl)-2-norbornene
5-(2'-propyl-2'-pentenyl)-2-norbornene
5-methylene-2-norbornene
2-methyl norbornadiene
2-ethyl norbornadiene
2-isopropyl norbornadiene
2-heptyl norbornadiene
1,8(9)-p-menthadiene
divinylbenzene
5-vinylbicyclo[2.2.1]hept-2-ene
bicyclo[4.3.0]nona-3,7-diene
4-vinyl cyclohexene-1

Any monoolefin having a single copolymerizable ethylenic group can be interpolymerized with the polyene. Although interpolymers satisfactory for some purposes can be made by interpolymerizing the polyunsaturated compound with a single monoolefin, e.g., copolymers of ethylene and dicyclopentadiene, or propylene and dicyclopentadiene, it is preferred to employ at least two comonomers with the polyunsaturated compound, one of these being ethylene. It is further preferred that ethylene comprise a substantial proportion of the interpolymer, i.e., at least about 30 percent by weight. It is desirable that the interpolymer be amorphous rather than substantially crystalline, and the tendency of ethylene to form crystalline polymers is reduced by the inclusion of a second comonomer.

Thus, a class of preferred interpolymers comprises a nonconjugated diene, ethylene, and at least one other monoolefin having a single terminal ethylenic group.

Of the large number of usable monoolefins, the preferred comonomers include those having the formula

where R is alkyl having, for example, up to about 20 carbon atoms, or aryl, and R' is hydrogen or alkyl of up to about 20 carbon atoms. Compounds of this class include propylene, 2-methylpropene, 2-propylhexene-1, 1- butene, 4-methyl-1-pentene, 1-pentene, 1-hexene, 1-octane, 5-methyl-1-nonone, 5,6,6-trimethyl-1-decene, 1-dodecene, 1-tetradecene, 1-octadecene, styrene and vinyl toluene.

The proportion of the second comonomer is not critical since, as mentioned, copolymers of a single monoolefin of the class described with the polyunsaturated compound can be employed. The preferred proportions vary depending on the identity of the particular monomers. For example, interpolymers of ethylene, propylene, and a nonconjugated diene, usually dicyclopentadiene, are among the most desirable interpolymers herein. Such interpolymers generally contain from about 10 percent to about 70 percent of ethylene, from about 10 percent to about 40 percent of propylene, and from about 5 percent to about 50 percent of the diene. It will be understood that the minimum amount of diene that can be employed depends to some extent upon its molecular weight. (The above percentages are by weight; the same is true of all parts and percentages throughout this specification unless otherwise specified.)

The interpolymers having the properties set forth above are produced from the foregoing monomers by carrying out the interpolymerization in the presence of a catalyst composed of an organic vanadium compound and an alkyl aluminum halide co-catalyst.

The most efficient organic vanadium compounds have been found to be vanadium tris(acetylacetonate) and vanadium oxybis(acetylacetonate). The amount of vanadium compound catalyst present is highly important in obtaining interpolymers of the desired properties. The concentration of catalyst employed is defined in terms of the concentration of the vanadium compound in the reaction mixture. It has been found that this concentration must be maintained at no higher than 0.002 mole per liter in order to produce the desired products in efficient amounts. The minimum concentration is not critical, since any amount produces some product; it is generally preferred to have present at least about 0.001 millimole of vanadium compound per liter.

The alkyl aluminum halide co-catalyst utilized along with the vanadium compound is typically ethyl aluminum dichloride, ethyl aluminum sesquichloride, diethyl aluminum chloride, butyl aluminum sesquichloride, ethyl aluminum sesquiiodide, or other alkyl aluminum halide. The concentration of the co-catalyst is not ordinarily critical; it is usually employed in an amount between about 3 to 30 moles per mole of vanadium compound.

In carrying out the process, there is employed a liquid reaction medium, which is suitably an organic solvent or one of the reactants in liquid form. Suitably purified xylene or similar aromatic solvent is generally utilized. For efficient operation, care should be taken to exclude oxygen and moisture. The temperature is maintained at room temperature or preferably below, e.g., 15° C. or lower, with temperatures as low as −80° C. or lower being advantageously utilized. One or more of the reactants is usually a gas, and they are generally fed to the reaction vessel as the polymerization progresses. Atmospheric pressure can be utilized in carrying out the interpolymerization reaction, but it is usually more efficient to employ elevated pressures, even up to 1000 atmospheres or more.

In a typical procedure for production of the interpolymers, the solvent is saturated with the ethylene and/or propylene or other gaseous monomer, and the polyunsaturated compound and any other non-gaseous monomer is added, followed by the alkyl aluminum halide. The polymerization is commenced by the addition of the vanadium compound and the gaseous monomers are added continuously, using an excess in order to maintain saturation of the mixture. If desired, increments of the vanadium compound, the alkyl aluminum halide, or both, can be added during the polymerization, and a second portion of the polyunsaturated compound is usually added. Alternatively, one or both of the catalysts and the polyunsaturated compound can be added continuously.

The catalysts are usually added as dilute solutions in aliphatic or aromatic hydrocarbons. At the end of the polymerization, residual catalyst is removed by treatment of the reaction mixture with aqueous hydrochloric acid and washing with distilled water until acid-free. Part of the solvent can then be distilled off if desired, and there can also be removed unreacted polyene, although it is not necessary to remove unreacted materials. The excess solvent and reactants, if removed, can be recovered or recycled.

It will be understood that the foregoing procedure can be varied considerably without affecting the essential nature of the product. For example, only one addition of the vanadium compound and the polyunsaturated compound can be made if desired, although in such a batch process a relatively low actual conversion is usually attained, even though the yield per unit of catalyst is acceptable. There may also be included in the reaction mixture a molecular weight regulator, such as hydrogen or a zinc dialkyl, which aids in obtaining low molecular weight interpolymers.

The interpolymers described above can be formulated into coating compositions for either clear coatings or pigmented paints, using conventional pigments and additives. They can be utilized in ordinary solvent based compositions employing toluene, xylene, benzene, naphtha, and similar aromatic or aliphatic solvents, or in water-containing emulsions, either water-in-oil or oil-in-water. They can also be applied as dispersions in plasticizers and/or organic solvents, i.e., as plastisols or organosols.

As discussed above, these interpolymers cure in the presence of oxygen either at ambient temperature, or, more suitably, at somewhat elevated temperatures to provide films of surprisingly good adhesion to most substrates, including iron, steel, phosphatized or other treated steel, aluminum, copper, nickel, tin and other metals, as well as wood, glass, plastics such as polyesters, and most primers.

The cured films produced have excellent hardness, flexibility, abrasion resistance, chemical resistance, and similar properties. While complete curing in most cases takes place without additives at temperatures as low as 50° F. or lower over a period of time, it is desirable to heat the film, for instance, to 275° F. to 350° F. for 10 to 40 minutes. Curing temperatures as high as 500° F. or even higher can be utilized.

Curing is also accelerated by the addition of certain driers commonly employed in oxidative cured films. Manganese and cobalt naphthenates are highly desirable in this respect, although other driers, such as lead and other metal naphthenates, octoates and linoleates are also of utility, as are similar compounds of these and other heavy metals, such as cerium, iron, chromium, copper and nickel. For example, by including about 0.5 percent by weight of manganese naphthenate, films of the interpolymers herein usually dry to a tack-free state in 2 hours at room temperature (about 77° F.), and complete curing is attained generally in 100 hours or less.

To illustrate the invention, there are given below several examples of the method and practice of the invention, both in producing the aforesaid interpolymers and their utilization in coating compositions. All parts and percentages are by weight unless otherwise specified.

EXAMPLE 1

A thoroughly clean and dry reaction vessel and fittings were flamed and cooled under a stream of nitrogen. The vessel was then charged with 3 liters of dried benzene and sparged with nitrogen for 15 minutes. While passing ethylene and propylene at the rate of 6 liters per minute each into the solution, there were added 52.8 milliliters of dicyclopentadiene, the mixture was cooled to 5° C., and 6.0 milliliters of a 1.0 molar solution of ethyl aluminum sesquichloride in benzene were then added.

Cooling was maintained throughout the polymerization, which was initiated by the addition of 15.0 milliliters of a 0.02 molar solution of vanadium oxybis(acetylacetonate) in benzene. The concentration of the vanadium compound was about 0.1 millimole per liter and the concentration of the ethyl aluminum sesquichloride was 2.0 millimoles per liter. Polymerization began immediately, as evidenced by the rise in the temperature to 8° C. and complete absorption of all gases passing into the solution, i.e., no off-gas could be observed. After about 1 minute, off-gas began to be observed once more; reaction conditions were maintained for 6 minutes after the addition of the vanadium compound, during which time the temperature dropped slowly to 5° C.

There were then added 20 milliliters of methanol and the reaction mixture was divided into equal portions; each portion was washed with 5 milliliters per liter of concentrated HCl and then washed with 500 milliliter increments of distilled water until acid-free. The portions were recombined and benzene was removed by evaporation at reduced pressure at room temperature or below. When most of the benzene had been removed, about 2 liters of aromatic naphtha (Solvesso 100; boiling range 150° C. to 170° C.) were added and stripping was continued until about three-quarters of the Solvesso 100 had been removed, thus also removing the residual dicyclopentadiene and benzene. The solution obtained had a solids content of 11.5 percent and a Gardner-Holdt viscosity of L. 249 grams of this solution were obtained containing 28.6 grams of interpolymer, corresponding to a catalyst efficient of 362 grams per grams of vanadium oxybis(acetylacetonate).

Films were drawn of the above polymer solution on phosphatized steel panels (Bonderite 1000), using a 3 mil drawdown bar and 3 layers of solution. The films air dried at room temperature to a tack-free state in 17 hours or less, and upon baking for 30 minutes at 300° F., produced a film having a Sward hardness of 48 (determined on a Sward rocker). Films were also drawn of the above polymer solution to which drier was added (a 10 to 1 weight ratio of manganese naphthenate and cobalt naphthenate in an amount sufficient to give 0.12 percent by weight of metal based on the solids content of the solution). The films containing drier were drawn and cured in the same manner as those without drier. The air-dried films attained a Sward hardness of 36 in 42 hours and a Sward hardness of 64 in 114 hours. The films were all solvent resistant, adherent and clear.

EXAMPLE 2

A thoroughly clean and dry reaction vessel was flushed with nitrogen gas, charged with 2.5 liters of benzene, and sparged with nitrogen for 15 minutes. Ethylene and propylene were passed into the solvent at a rate of 2.0 liters and 4.0 liters per minute, respectively, and this was maintained throughout the polymerization. There were then added 25 milliliters of dicyclopentadiene and, after cooling to 7° C., 7.5 milliliters of a 1.0 molar solution of ethyl aluminum sesquichloride in benzene were added. While maintaining the temperature between 7° C. and 11° C. 25 milliliters of a 0.01 molar solution of vanadium oxybis(acetylacetonate) in benzene were introduced, whereupon off-gas rate dropped to zero, then rose in 2 minutes to 360 liters per hour, indicating that absorption had ceased. Another 26 milliliter portion of the vanadium oxybis(acetylacetonate) solution was added, whereupon again all the gas added was absorbed for a short time and then absorption ceased. The catalyst addition was again repeated, and after absorption ceased once more, 25 milliliters of dicyclopentadiene were added, along with another catalyst portion as above. Three more additions of the vanadium catalyst were made, in each case after absorption had ceased.

The polymerization was carried out for a total of 40 minutes from the time of the first vanadium catalyst addition, and was terminated by the addition of 10 milliliters of methanol. The reaction mixture was then washed with 30 milliliters of concentrated HCl, and then washed acid-free with 15 one-liter portions of distilled water. The benzene was stripped at reduced pressure, as in Example 1, and replaced with about 1.5 liters of mineral spirits, and stripping continued until most of the mineral spirits had been removed. There was obtained 247 grams of solution containing 78.8 grams of interpolymer (solids content of 31.0 percent). Infra-red analysis of the product showed the absence of free dicyclopentadiene and indicated that the approximate polymer composition was 40 percent ethylene, 24 percent propylene, and 36 percent dicyclopentadiene, all in polymerized form.

EXAMPLE 3

A clean, dried reaction vessel was flushed with nitrogen, charged with 3.0 liters of aromatic naphtha (Solvesso 100) and sparged with nitrogen for 15 minutes. Ethylene and propylene were then passed into the solvent at a rate of 2.0 liters per minute each. There were added 8.4 milliliters of a 1 molar solution of ethyl aluminum sesquichloride in benzene, and the mixture was cooled to 7° C. The rate of ethylene and propylene was decreased to 1.0 liter per minute each and 20 milliliters of dicyclopentadiene were added. There were then added 20 milliliters of a 0.01 molar solution of vanadium tris (acetylacetonate) in benzene. After 2 minutes the rate of ethylene and propylene addition was again increased to 2.0 liters per minute each and continuous addition of 2.0 milliliters per minute of the vanadium compound solution and 1.0 milliliter per minute of dicyclopentadiene was begun.

The temperature rose to 12° C. and then slowly fell to 7 to 9° C. during the remainder of the polymerization. After 9 minutes from the initial vanadium catalyst addition, the rate of addition of the vanadium catalyst solution was increased to 4.0 milliliters per minute and the addition of dicyclopentadiene was increased to 2.0 milliliters per minute. After 6 more minutes, the rate of ethylene and propylene addition was decreased to 1.0 liter per minute each. After 32 more minutes, the addition of dicyclopentadiene was ended, and after another 11 minutes the addition of the vanadium compound was complete. Ethylene and propylene were passed into the mixture for anothre 20 minutes, and then 10 milliliters of methanol were added. A total of 210 milliliters of the vanadium compound solution and 90 milliliters of dicyclopentadiene had been added.

The clear product solution was washed 3 times with 5 percent aqueous HCl, then washed with distilled water until acid-free. The solution was then concentrated at 12 to 20 millimeters of mercury pressure and 35 to 45° C. There was obtained a solution having a solids content of 9.4 percent and containing a total of 66.9 grams of interpolymer. Films of the product were drawn as in Example 1, and upon air drying at room temperautre reached a Sward hardness of 17 after 17 hours. Films containing drier (as in Example 1) had a Sward hardness of 46 after 17 hours. The films also had a good impact resistance and humidity resistance, as well as good adhesion to the substrate and good appearance.

EXAMPLE 4

Following the procedure of Example 1, an interpolymer was produced from ethylene, propylene and 5-methylene-2-norbornene, using 2.5 liters of benzene, 13.3 grams of 5-methylene-2-norbonene, 3.6 milliliters of a 1.4 molar solution of ethyl aluminum sesquichloride in toluene, and 12.5 milliliters of a 0.02 molar solution of vanadium oxybis(acetylacetonate) in benzene. The ethylene and propylene were added at a rate of 6.0 liters per minute each. After the polymer solution had been washed with acid and water, benzene was removed and Solvesso 100 was added and partially distilled at 25° C. an reduced pressure. There was obtained 689 grams of a solution containing 41.4 grams of interpolymer. When drawn as film on steel panels, the interpolymer produced tack-free coatings within 3 hours at room temperature and had good adhesion and appearance.

Other tests have shown that interpolymers which cure through an oxidative mechanism, as discussed above, are produced from various other polyunsaturated hydrocarbons. Data from several of these tests are shown in Table I; in each case, the procedure was similar to that of Example 1, and the products obtained, when drawn as films, cured in the presence of air in the manner described above to give coatings of desirable properties.

were compared with the somewhat related coating polymers based on butadiene. The several coatings tested were as follows:

Interpolymer F—Interpolymer similar to that of Example 2.

Interpolymer G—Interpolymer similar to that of Example 1.

Butadiene resin H—Butadiene-styrene copolymer (about 80 percent butadiene) having a molecular weight of about 8,000–10,000 and an iodine value of about 300 (Buton 100).

Butadiene resin I—Polybutadiene, with a ratio of 1,2-addition to 1,4-addition of about 3 to 1 (Buton 150).

Butadiene resin J—Butadiene copolymer having un-

TABLE I

| Ex. | Polyunsaturated Hydrocarbon | Concentration, mmole/l. | $C_2H_4/C_3H_6$, Vol. Ratio | Solvent | Vanadium Cat. Conc., mmole/l. | Co-catalyst Conc., mmole/l. | Polymer Yield, Grams | Final Solution Solvent | Solids, Percent |
|---|---|---|---|---|---|---|---|---|---|
| 5 | 1,3-cyclopentadiene | 70 | 1/4 | Benzene | 0.2 | 2.0 | 18.9 | Solvesso 100 | 9.7 |
| 6 | 2-methyl-1,5-hexadiene | 150 | 1/2 | do | 0.1 | 2.0 | 17.4 | Xylene | 14.9 |
| 7 | 1,7-octadiene | 123 | 1/1 | Xylene | 0.1 | 2.0 | 27.7 | do | 3.3 |
| 8 | Methylcyclopentadiene dimer | 130 | 1/1 | Benzene | 0.1 | 2.0 | 9.1 | Aromatic Naphtha* | 7.8 |

*Boiling range 185° C.–203° C.

As indicated above, the level of unsaturation is an important consideration in the curing properties of the interpolymers of the invention. Illustrating this was a test in which a series of four interpolymers (Interpolymers A, B, C and D) were made as in Example 1, but using varying concentrations of dicyclopentadiene during the polymerization. Also included for comparison is a similar interpolymer (Interpolymer E) not within the invention and containing a lower level of unsaturation. These were analyzed for weight percent unsaturation by nuclear magnetic resonance spectroscopy, as discussed above. Drier was added to each interpolymer (10 to 1 weight ratio of manganese naphthenate and cobalt naphthenate; 0.12 percent metal based on total solids), and films were drawn and air-dried at room temperature for 114 hours. The results are shown in Table II.

TABLE II

| Interpolymer: | Dicyclopentadiene Concentration (moles/l.) | Wt. percent Unsat. (NMR) | Sward Hardness |
|---|---|---|---|
| A | 0.10 | 3.6 | 34 |
| B | 0.13 | 4.8 | 52–64 |
| C | 0.074 | *3.6 | 20 |
| D | 0.025 | 2.4 | 6–10 |
| E | | 1.2 | Tacky |

*Appears high based on dicyclopentadiene concentration.

It will be realized that the foregoing do not constitute the optimum interpolymers of the invention, but they do illustrate the manner in which an increase in the level of unsaturation provides an increase in the extent and rate of cure attained.

To evaluate further the coatings produced from the interpolymers herein, they were compared with other coatings of various types. For example, in one series they saturation and recommended for coating uses.

Films were drawn with added metal drier on phosphatized steel panels (Bonderite 100) to give a film thickness of 1.0 to 1.3 mils. Some of the panels were air-dried at room temperature for 160 hours, and others were baked for 30 minutes at 300° F. The drier used was a 10 to 1 weight ratio of manganese naphthenate and cobalt naphthenate, and was employed in an amount equivalent to 0.06 weight percent metal based on total solids. Tests run included Sward hardness, impact resistance (Gardner variable impact tester, direct/reverse), adhesion, and blush resistance (immersion in boiling water, with a permanent blush indicating failure). Results are shown in Table III.

TABLE III

| Coating | Cure | Sward Hardness | Impact Resistance, Inch-lbs.* | Adhesion | Blush Resistance |
|---|---|---|---|---|---|
| Interpolymer F | Air-dry | 30 | 80/80 | Excellent | Acceptable. |
| Interpolymer G | do | 35 | 80/80 | Good | Do. |
| Butadiene resin H | do | 25 | 35/20 | do | Failed. |
| Butadiene resin I | do | 38 | 80/80 | do | Do. |
| Butadiene resin J | do | 10 | 80/60 | Poor | Do. |
| Interpolymer F | Baked | 28 | 80/80 | Good | Acceptable. |
| Interpolymer G | do | 36 | 80/80 | do | Do. |
| Butadiene resin H | do | 10 | 60/45 | Fair | Do. |
| Butadiene resin I | do | 12 | 40/10 | do | Do. |
| Butadiene resin J | do | 37 | 15/15 | do | Do. |

*80 inch-lbs. maximum tested.

As indicated, the films of the present interpolymers had properties generally superior to those of the various polymers of butadiene; other tests in which films without added drier were air-dried and baked also showed similar results.

In other tests in which coatings of other materials of related composition were tested similarly, it was found that they did not substantially cure through an oxidative mechanism. For example, films of ethylene-propylene copolymers and conventional rubbery ethylene-propylene-diene terpolymers did not cure and remained tacky, even after baking for 30 minutes at 300° F. in the presence of drier (0.12 percent metal, 10 to 1 ratio of manganese and cobalt naphthenate). This was true even with a rubbery terpolymer having the lowest intrinsic viscosity and highest unsaturation level of those known heretofore.

In the coating compositions exemplified above, the interpolymers of the invention provide the essential or sole film-forming component. Such coating compositions have the properties necessary for highly desirable protective and decorative coatings on various metals, including iron, steel, aluminum, copper, and the like, as well as on glass, wood, paper, plastics and other substrates. However, useful coating compositions are also achieved by combining the interpolymers herein with other resinous materials, including not only plasticizers and other noncoreactive products, but also various substances which coreact with the interpolymer during curing or before, as while formulating or even during polymerization. Advantages of the use of coreactive materials with the interpolymers include the attainment of specific properties of the cured coatings, modification of solution properties, and similar objectives.

Among the compositions containing coreactive materials along with the interpolymers are those described in co-pending application, Ser. No. 413,327, filed on the same day herewith. In these compositions the interpolymers of the present invention are combined with an unsaturated glyceride oil.

Other coreactive materials that can be combined with these interpolymers include various polymers containing olefinic unsaturation or other functional groups or sites, which can react with the interpolymer or with oxidation products of the interpolymer during curing. These include, for example, oil-modified alkyd resins, such as drying or semi-drying oil modified glycerol phthalate resins; glyceride oils or oil-modified alkyl resins reacted with cyclopentadiene or a polymer thereof, such as those described in U.S. Patents 2,399,179 and 2,404,836; epoxidized butadiene polymers, such as those known as Oxiron resins; polymers or copolymers of unsaturated aldehydes such as acrolein, polymerized through the aldehyde groups leaving residual unsaturation; maleates, optionally in the presence of reactive solvents such as styrene; hydrocarbon resins containing ethylenic unsaturation, such as polymerized petroleum fractions, including residues known as distillate bottoms; reaction products of drying and semi-drying oils and unsaturated dicarboxylic or anhydrides, such as the so-called maleinized oils, e.g., the adduct of maleic anhydride and linseed or soya oil; reactive solvents, such as styrene, vinyl toluene, or other vinyl aromatic hydrocarbons, or acrylates or methacrylates, e.g., methyl methacrylate; resins containing free —SH groups, such as those produced by reacting dichlorodiethylformal and alkali polysulfide (Thiokol resins); epoxy resins, such as the reaction products of bisphenol A and epichlorohydrin, epoxidized alicyclic compounds, and other poly-epoxides and monoepoxides; interpolymers of unsaturated carboxylic acid amides and other ethylenic monomers, which may be aldehyde-modified and etherified, for example, those disclosed in U.S. Patent No. 2,978,437 and U.S. Patent No. 3,037,963; aminoplast resins, such as maleamine-formaldehyde and urea-formaldehyde condensation products; and others of similar chemical structure and reactivity.

Exemplifying such embodiments of the invention are the following:

EXAMPLE 9

An interpolymer was produced as in Example 1, whereby there was obtained a solution containing 21.8 percent solids and having a Gardner-Holdt viscosity of Y to Z. There were mixed 7.65 parts of the interpolymer solution and 1.85 parts of a mineral spirits solution (60 percent solids) of a reaction product of dicyclopentadiene and a 1 to 1 weight ratio of linseed oil and tung oil. The reaction product contained 35 percent by weight of dicyclopentadiene. To the mixture was also added sufficient of a 10 to 1 weight ratio manganese naphthenate and cobalt naphthenate to give 0.12 percent by weight of metal, based on solids. Films of the mixture were drawn on phosphatized steel panels (Bonderite 1000) in a 3 mil wet film thickness and baked for 30 minutes at 300° F. The film obtained had excellent properties, including a Sward hardness of 57.

EXAMPLE 10

Example 9 was repeated using a maleinized oil (reaction product of 80 percent by weight of linseed oil and 20 percent by weight of maleic anhydride) in place of the dicyclopentadiene-modified oil solution. After the film had been air-dried for 98 hours (in place of baking) it had a Sward hardness of 39 and other highly desirable properties.

EXAMPLE 11

Example 9 was repeated using a resin consisting of unsaturated petroleum distillate bottoms (known as Enjay CTLA polymer) which was mixed with the interpolymer in an amount equivalent to 15 percent by weight based on the total resinous materials present. Films were both air-dried and baked; the film which was air-dried had a Sward hardness of 34 after 116 hours, and the baked film (30 minutes at 300° F.) had a Sward hardness of 38 to 54 and other excellent properties, including good impact resistance, solvent resistance and resistance to boiling water (no blush after 60 minutes). Similar results were obtained from films containing 40 percent by weight of the CTLA polymer. Mixtures containing as much as 70 percent by weight of the CTLA polymer provided useful films, although of somewhat lower hardness and resistance.

EXAMPLE 12

Example 9 was repeated using a mixture containing 15 percent by weight of an epoxidized butadiene polymer containing a small proportion of pendant acetate and hydroxyl groups (Oxiron 2001). Again, films having highly desirable properties were obtained; a film air-dried for 116 hours had a Sward hardness of 30 and one baked at 300° F. for 30 minutes had a Sward hardness of 36.

EXAMPLE 13

Example 9 was repeated using mixtures of the interpolymer and an alkyd resin containing both 15 percent and 40 percent by weight of the alkyd, based on resin solids. The alkyd resin was employed as a toluene solution of 49.6 percent solids content, and was composed of 48.9 percent glycerol phthalate, 8.2 percent ethylene glycol phthalate, 6.5 percent excess glycol and 36.4 percent soybean oil, with an acid number of 4.51. Films (4 mil wet thickness) were both air-dried and baked for 30 minutes at 300° F. The air-dried films obtained from the 15 percent mixture had a Sward hardness of 33 water 98 hours; the baked coating of the same composition had a Sward hardness of 48. The 40 percent mixture provided coatings which had a Sward hardness of 38 after 98 hours air-dry and 55 after baking. All the coatings had good adhesion and other properties.

EXAMPLE 14

Example 9 was repeated using a mixture of 8.66 parts of the interpolymer solution and 0.7 part of an epoxy resin solution (reaction product of bisphenol A and epichlorohydrin, having an epoxide equivalent of 450–525; 65 percent solids in toluene). A 5 mil wet film, after baking at 300° F. for 30 minutes, had a Sward hardness of 14 and good impact resistance, solvent resistance and flexibility.

EXAMPLE 15

Example 14 was repeated using 8.84 parts of the interpolymer solution and 0.56 part of a 60 percent solution in butyl alcohol of a butylated melamine formaldehyde resin made from 1 mole of melamine, 6 moles of formaldehyde and 5.3 moles of butanols. The film obtained again had excellent properties, including a Sward hardness of 38.

EXAMPLE 16

Example 15 was repeated using 7.80 parts of the interpolymer solution and 0.59 part of an amide interpolymer resin (50 percent solids in a solvent mixture of 32.5 percent butanol, 22.5 percent xylene and 45 percent toluene). The amide interpolymer was composed of 10 percent acrylamide, 87.5 percent styrene, and 2.5 percent methacrylic acid, and was reacted with formaldehyde and butanol as described in U.S. Patent No. 3,037,963. The film obtained had outstanding properties including a Sward hardness of 54.

The foregoing illustrate the invention in its preferred embodiments, but it is of course understood that numerous variations and modifications can be made within the scope of the invention as described. For example, other polyunsaturated hydrocarbons and monoolefins can be substituted for those employed in the examples. Similarly, coating compositions can be produced from mixtures of the herein-described interpolymers; also the interpolymers herein can be utilized for other purposes, as to provide non-supported films, adhesives, foams and other products, employing therewith suitable additives and other components.

According to the provisions of the patent statutes, there are described above the invention and what are now considered to be its best embodiments. However, within the scope of the appended claims, it is to be understood that the invention can be practised otherwise than as specifically described.

What is claimed is:

1. A non-rubbery interpolymer of a cyclic polyene monomer selected from the group consisting of 1,3 - cyclopentadiene, 5 - methyl - 1,3 - cyclopentadiene, dicyclopentadiene, tricyclopentadiene and 5 - methyl - 1,3 - cyclopentadiene dimer and at least one monoolefin monomer having a single copolymerizable ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

2. The non-rubbery interpolymer of claim 1 in which said cyclic polyene monomer is dicyclopentadiene.

3. A non-rubbery interpolymer of a cyclic polyene monomer selected from the group consisting of 1,3-cyclopentadiene, 5 - methyl - 1,3 - cyclopentadiene, dicyclopentadiene, tricyclopentadiene and 5 - methyl - 1,3 - cyclopentadiene dimer and at least one monoolefin monomer having a single terminal ethylenic group, said interpolymer having an essentially saturated carbon chain containing a substantial proportion of the total carbon atoms in the polymer molecule, said interpolymer having an intrinsic viscosity of no higher than 0.6 and containing at least about 3.5 percent by weight of ethylenic unsaturation in the polymer molecule.

4. The non-rubbery interpolymer of claim 3 in which said monoolefin monomer comprises ethylene.

5. A non-rubbery interpolymer of a monomer selected from the group consisting of 1,3 - cyclopentadiene, 5 - methyl - 1,3 - cyclopentadiene, dicyclopentadiene, tricyclopentadiene and 5 - methyl - 1,3 - cyclopentadiene dimer, ethylene and propylene, having an essentially saturated carbon chain containing a substantial proportion of the total carbon atoms in the polymer molecule, said interpolymer having an intrinsic viscosity of no higher than about 0.6 and containing at least about 2.5 percent by weight of ethylenic unsaturation in the polymer molecule.

6. A coating composition in which the film-forming component comprises a non-rubbery interpolymer of a cyclic polyene monomer selected from the group consisting of 1,3 - cyclopentadiene, 5 - methyl - 1,3 - cyclopentadiene, dicyclopentadiene, tricyclopentadiene and 5-methyl-1,3-cyclopentadiene dimer and at least one monoolefin having a single copolymerizable ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

7. A coating composition in which the film-forming component comprises a non-rubbery interpolymer of a monomer selected from the group consisting of 1,3-cyclopentadiene, 5-methyl-1,3 - cyclopentadiene, dicyclopentadiene, tricyclopentadiene and 5-methyl-1,3 - cyclopentadiene dimer, ethyene, and at least one other monoolefin monomer having a single terminal ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

8. The coating composition of claim 7 in which said non-rubbery interpolymer can be cured at a temperature below 100° F.

9. The coating composition of claim 7 in which said non-rubbery interployer contains from about 10 percent to about 70 percent by weight of ethylene.

10. A coating composition in which the film-forming component comprises a non-rubbery interpolymer of a monomer selected from the group consisting of 1,3-cyclopentadiene, 5-methyl-1,3-cyclopentadiene, dicyclopentadiene, tricyclopentadiene and 5-methyl-1,3-cyclopentadiene dimer, and at least one other monoolefin monomer of the formula

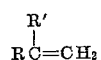

where R is selected from the class consisting of alkyl of up to about 20 carbon atoms and aryl and R' is selected from the class consisting of hydrogen and alkyl of up to about 20 carbon atoms, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

11. The coating composition of claim 10 in which said non-rubbery interpolymer is comprised of from about 15 to about 50 percent by weight of a monomer selected from the group consisting of 1,3-cyclopentadiene, 5-methyl-1,3-cyclopentadiene, dicyclopentadiene, tricyclopentadiene and 5-methyl-1,3-cyclopentadiene dimer, from about 10 to about 40 percent by weight of propylene, and from about 10 to about 70 percent by weight of ethylene.

12. The coating composition of claim 11 in which said first-mentioned monomer is dicyclopentadiene.

13. An organic solvent based coating composition comprising inert organic solvent and as a film-forming component a non-rubbery interployner selected from the group consisting of 1,3-cyclopentadiene, 5-methyl-1,3-cyclopentadiene, dicyclopentadiene, tricyclopentadiene and 5-methyl-1,3-cyclopentadiene dimer and at least one monoolefin monomer having a single terminal ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

14. The coating composition of claim 13 in which said non-rubbery interpolymer is comprised of dicyclopentadiene and a major proportion of ethylene.

15. The coating composition of claim 13 in which said first-mentioned monomer is dicyclopentadiene.

16. A solid substrate having thereon a cured adherent layer of the coating composition of claim 6.

17. A solid substrate having thereon a cured adherent layer of the coating composition of claim 7.

18. A solid substrate having thereon a cured adherent layer of the coating composition of claim 10.

19. A solid substrate having thereon a cured adherent layer of the coating composition of claim 13.

20. A method of producing a non-rubbery interpolymer having an intrinsic viscosity no higher than about 0.6 and having at least about 2.5 percent by weight of ethylenically unsaturated groups in the polymer molecule which comprises interpolymerizing in a liquid reaction media a cyclic polyene monomer selected from the group consisting of 1,3-cyclopentadiene, 5-methyl-1,3-cyclopentadiene, dicyclopentadiene, tricyclopentadiene, 5-methyl-1,3-cyclopentadiene dimer and conjugated dienes with at least one monoolefin monomer having a single terminal ethylenic group in the presence of an alkyl aluminum halide and at least one vanadium compound selected from the group consisting of vanadium tris(acetylacetonate) and vanadium bis(acetylacetonate), the concentration of said vanadium compound in the reaction mixture being below 0.002 mole per liter, the mole ratio of aluminum to vanadium being between about 3 and about 30 moles of aluminum compound per mole of vanadium compound, said reaction being conducted at or below room temperature in the presence of a molecular weight regulator.

21. A resinous composition comprising the non-rubbery interpolymer of claim 1 and another polymeric material co-reactive therewith.

22. The resinous composition of claim 21 in which said other polymeric material contains ethylenic unsaturation.

23. The composition of claim 21 in which said other polymeric material is a reaction product of a glyceride oil-containing moiety and a member of the group consisting of cyclopentadiene and lower polymers thereof.

24. The composition of claim 21 in which said other polymeric material is an epoxidized butadiene polymer.

25. The composition of claim 21 in which said other polymeric material is the residue from distillation of petroleum.

26. The composition of claim 21 in which said other polymeric material is an epoxy resin.

27. The composition of claim 21 in which said other polymeric material is an aminoplast resin.

28. The composition of claim 21 in which said other polymeric material is an interpolymer of an unsaturated carboxylic acid amide and at least one other copolymerizable ethylenic monomer.

29. A non-rubbery interpolymer of a cyclic conjugated polyene monomer selected from the group consisting of 1,3-cyclopentadiene and 5-methyl-1,3-cyclopentadiene, and at least one monoolefin monomer having a single copolymerizable ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

30. An organic solvent based coating composition comprising an inert organic solvent and as a film-forming component, a non-rubbery interpolymer of a conjugated polyene monomer selected from the group consisting of 1,3-cyclopentadiene and 5-methyl-1,3-cyclopentadiene, and at least one monoolefin monomer having a single terminal ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

31. A resinous composition comprising the non-rubbery interpolymer of claim 1 and a reaction product of glyceride oil-containing moiety and an unsaturated dicarboxylic acid anhydride.

References Cited

UNITED STATES PATENTS

| | | | |
|---|---|---|---|
| 3,260,708 | 7/1966 | Natta et al. | 260—79.5 |
| 2,762,851 | 9/1956 | Gleason | 260—669 |
| 3,224,985 | 12/1965 | Gladding et al. | 260—5 |
| 3,301,833 | 1/1967 | Natta et al. | 260—80.5 |
| 3,313,793 | 4/1967 | De Lamare et al. | 260—94.7 |
| 3,342,769 | 9/1967 | Souffie | 260—33.6 |
| 2,399,179 | 4/1946 | Gerhart | 260—23.7 |
| 2,823,194 | 2/1958 | McKay et al. | 260—887 |
| 2,933,480 | 4/1960 | Gresham et al. | 260—80.5 |
| 3,000,866 | 9/1961 | Tarney | 260—80.5 |
| 3,219,618 | 11/1965 | Freitag | 260—33.6 |
| 3,222,333 | 12/1965 | Duck et al. | 260—80.7 |
| 3,234,383 | 2/1966 | Barney | 260—80.5 |
| 3,271,372 | 9/1966 | Caywood | 260—80.5 |
| 3,291,780 | 12/1966 | Gadding et al. | 260—80.5 |
| 3,294,721 | 12/1966 | Belanger | 260—23.7 |
| 3,297,598 | 1/1967 | Mills | 260—3 |

OTHER REFERENCES

Payne: "Organic Coating Technology," vol. 1, 1954, pp. 244 and 249.

DONALD E. CZAJA, Primary Examiner

R. A. WHITE, Assistant Examiner

U.S. Cl. X.R.

260—23,5, 33.6, 88.2, 80.78, 80.7, 85.3, 836, 837, 854, 874, 666